(12) United States Patent
Mayo

(10) Patent No.: US 7,757,471 B2
(45) Date of Patent: Jul. 20, 2010

(54) AGRICULTURAL HARVESTER HAVING AUTOMATED TREE SENSING AND SHAKING DEVICE AND METHOD

(75) Inventor: Donald P. Mayo, Yuba City, CA (US)

(73) Assignee: Orchard Machinery Corporation, Yuba City, CA (US)

( * ) Notice: Subject to any disclaimer, the term of this patent is extended or adjusted under 35 U.S.C. 154(b) by 88 days.

(21) Appl. No.: 12/255,009

(22) Filed: Oct. 21, 2008

(65) Prior Publication Data

US 2010/0095644 A1 Apr. 22, 2010

(51) Int. Cl.
*A01D 46/00* (2006.01)
(52) U.S. Cl. ........................ 56/340.1; 701/41
(58) Field of Classification Search ................ 56/340.1, 56/10.2 R, 1, 10.2 A, 10.2 D, 10.2 F, 328.1, 56/DIG. 9, DIG. 10; 701/41, 23
See application file for complete search history.

(56) References Cited

U.S. PATENT DOCUMENTS

| | | | | |
|---|---|---|---|---|
| 3,656,283 A | * | 4/1972 | Shipley | ............................ 56/1 |
| 4,015,366 A | * | 4/1977 | Hall, III | ........................ 47/1.43 |
| 4,194,347 A | * | 3/1980 | Peters | ........................ 56/340.1 |
| RE31,023 E | * | 9/1982 | Hall, III | ........................ 405/37 |
| 4,768,332 A | * | 9/1988 | Bizzini | ........................ 56/340.1 |
| 5,103,625 A | * | 4/1992 | McCrill | ........................ 56/340.1 |
| 5,413,453 A | * | 5/1995 | Hill | ............................ 414/729 |
| 5,473,875 A | * | 12/1995 | Zehavi et al. | ............... 56/340.1 |
| 5,653,097 A | * | 8/1997 | Hill | ............................ 56/340.1 |
| 6,360,518 B1 | * | 3/2002 | Scott et al. | .................. 56/328.1 |
| 6,658,834 B1 | * | 12/2003 | Mayo | ........................ 56/340.1 |
| 6,832,469 B2 | * | 12/2004 | Scott et al. | ..................... 56/330 |
| 7,543,436 B2 | * | 6/2009 | Scott et al. | .................. 56/328.1 |
| 2008/0016838 A1 | * | 1/2008 | Pellenc et al. | ............... 56/340.1 |

* cited by examiner

*Primary Examiner*—Árpád Fábián-Kovács
(74) *Attorney, Agent, or Firm*—Sanford Astor; Lewis Brisbois Bisgaard & Smith

(57) ABSTRACT

An automatically operated agricultural tree harvesting machine having systems for automatically steering, propelling and stopping the harvester machine to shake each tree, eliminating the need for the operator to steer or manually engage the shaker head. The system comprises a series of sensors to determine the location of each tree and a system for controlling the steering of the harvester and to determine the distance moved.

18 Claims, 4 Drawing Sheets

AGRICULTURAL HARVESTER HAVING AUTOMATED TREE SENSING AND SHAKING DEVICE AND METHOD

FIELD OF THE INVENTION

The present invention relates to mechanized agricultural tree harvesters that utilize shaker heads to shake fruit and nut trees, and more particularly to such a harvester having improved tree sensing devices and a related system that automatically detects, clamps and shakes trees.

BACKGROUND OF THE INVENTION

Tree harvesters for shaking nut and fruit trees to cause nuts or fruit-to drop to the ground for harvesting to are well known in the prior art. R. W. Brandt, Jr. was a prolific inventor in this field and his U.S. Pat. Nos. 3,163,458; 3,220,268; 3,221,567; and 3,318,629 describe various features of tree harvesters and shaker heads that are still used in current devices.

Applicant herein invented a tree shaking machine with automatic sensors described in U.S. Pat. No. 6,658,834, issued on Dec. 9, 2003. This application is an improvement on the machines described in that patent.

When the harvest time of a particular crop occurs, thousands of trees in orchards become ripe at the same time. The shaking of these thousands of trees is a time consuming process, that must be completed quickly, and it is therefore advantageous to create systems that complete the tree shaking operating as quickly as possible, so that more trees can be harvested more rapidly, while the crop is ripe, and before it becomes over ripe and then spoiled. The present invention is an improved automation of the tree harvester shaking process, and it includes tree sensing devices along with a system for automatically deploying the harvester machine and the shaking head, clamping the tree, shaking the tree, releasing the tree and returning the shaker head to the harvester.

Prior U.S. Pat. No. 6,658,834 describes a tree sensing device, mounted upon the harvester. Pre-determined tree distance values and other shaker head control parameters are input into a programmable logic control (PLC) device of the control system. When the harvester is driven to a location next to a tree, the operator initiates an automated tree shaking cycle in which the tree sensor locates the tree and provides distance values to the tree as input signals to the controller. The controller compares the distance values to the tree with the pre-determined tree distance value and provides shaker head control signals that cause the shaker head to automatically move outward towards the tree. The shaker head outward motion is halted when the inputted distance values to the tree are equal to or less than the predetermined tree distance values. The control system then provides control signals to the shaker head components to cause the shaker head to clamp the tree, to shake the tree, to unclamp the tree and to move the shaker head back to the harvester. Further control input signals to the controller include engine RPM signals for controlling the engine RPM and tree shaking time signals for controlling the duration of the tree shaking step.

SUMMARY OF THE INVENTION

The instant invention improves shaking technology by automatically steering, propelling and stopping the harvester machine to shake each tree, eliminating the need for the operator to steer or manually engage the shaker head.

This new technology utilizes a series of sensors and/or vision systems. In one embodiment the harvester has 7 inputs, which comprise 4 sensors, 1 vision system, a joystick and a monitor.

1) Sensor A is the existing sensor from the previous patent for finding the tree.
2) Sensor B is a linear potentiometer for determining the direction of the front steering.
3) Sensor C consists of a pulse pick-up in the drive motor for determining the distance to move by counting the revolutions of the front tire.
4) Sensor D utilizes a linear potentiometer for shaker head position and calculating the distance to the tree and the angular difference between trees.
5) Sensor E employs a vision system to identify the tree trunk and calculate the distance to the next tree.
6) A joystick provides digital input to start the system.
7) A monitor sets the parameters for engine speed and shaker duration.

The software is contained within a programmable logic control device (PLC) which calculates the distance from machine to tree and tree to tree. The output signal then modifies the steering controls to maintain optimum shaker performance as follows:

1) The controller outputs a signal to the controller on the ground drive which propels the machine.
2) The controller output provides the power for the electric over hydraulic functions including steering, clamp/shake, unclamp and in/out.

The system operates as follows:

Step 1—The operator drives to the first tree and positions the shaker parallel to the tree row, aligning the shaker head with the first tree to be shaken.

Step 2—The operator then presses a button on the joystick to start the automatic shake cycle (pre-existing patent). As the shaker goes through its cycle it will measure the distance to the tree, via Sensor D. The measurement takes place as the head extends to the tree.

Step 3—The shaker will then take the information from Sensor E (distance to the next tree) and propel the machine forward. While propelling forward, Sensor C determines when to stop.

Step 4—Once again the automatic cycle starts. Now Sensor D takes a new distance measurement to the next tree, as it extends the shaker head.

Step 5—A calculation from the first tree distance to the second tree distance is made. The difference between the two will now be used to figure the angular adjustment needed on the front steering caster. A signal will actuate a valve to turn a steering caster until Sensor B reaches the desired angle pointing the shaker in the correct direction.

Step 6—Forward movement of the machine begins and the machine moves to the recalculated position and the cycle then repeats itself.

DETAILED DESCRIPTION OF THE INVENTION

Figure 1:
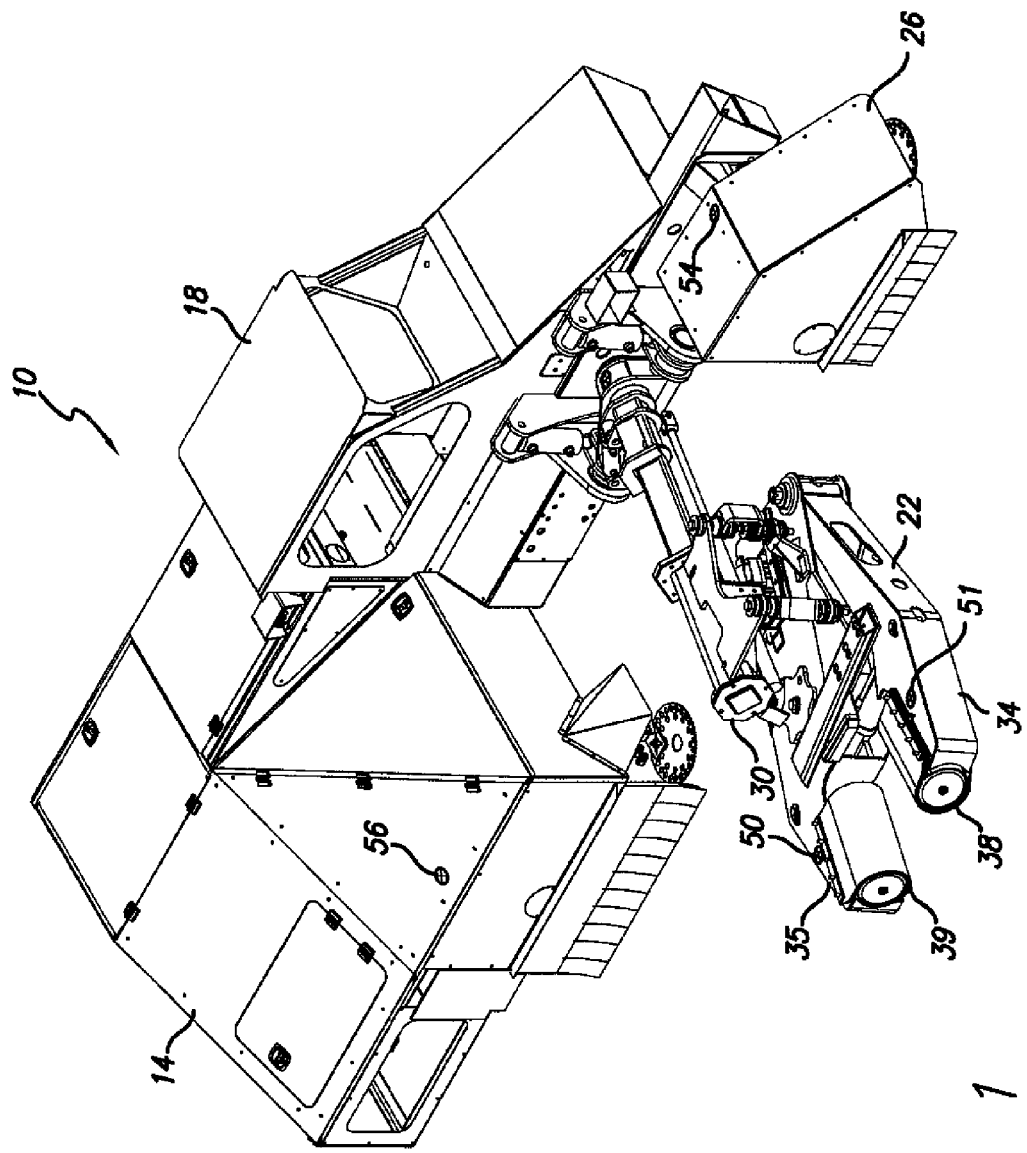
FIG. 1 is a perspective view of a tree harvester including an automatic tree sensing device and system of the present invention.
Figure 2:
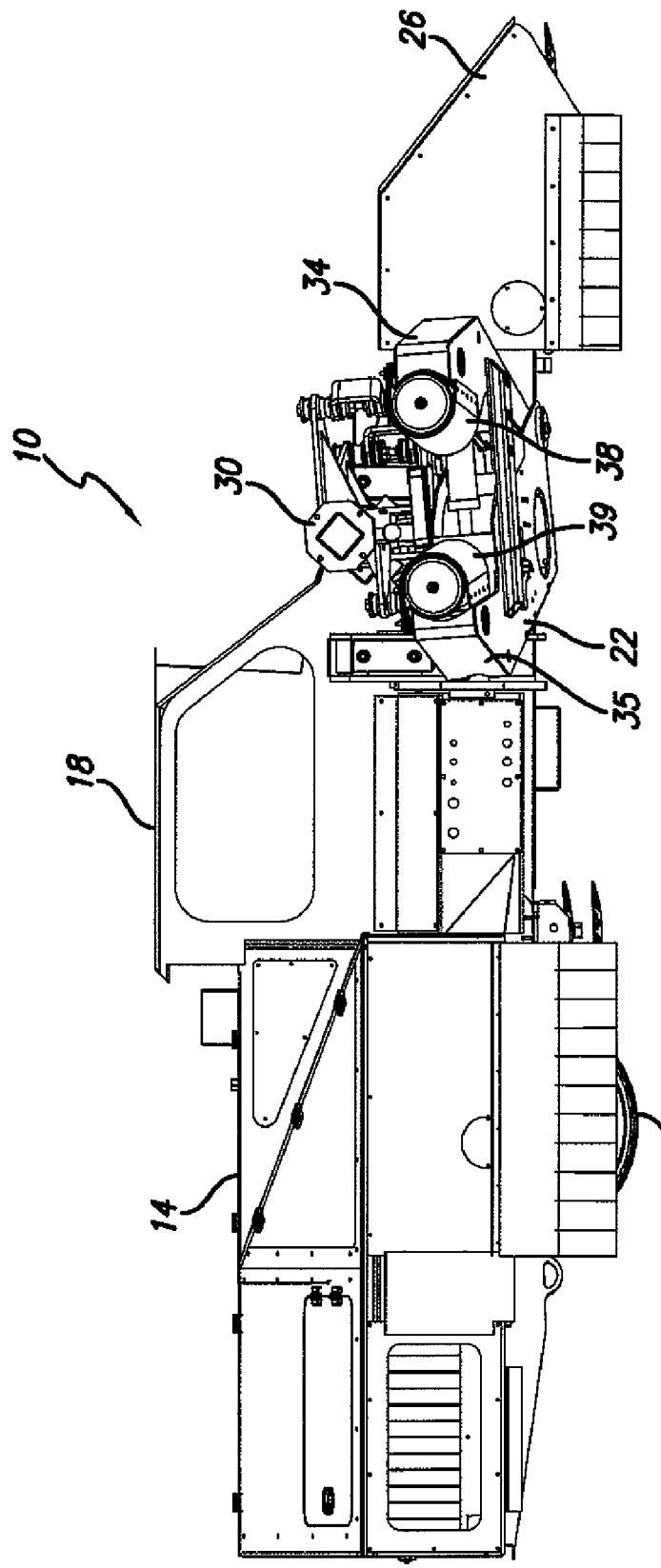
FIG. 2 is a side elevational view of the harvester depicted in FIG. 1.
Figure 3:
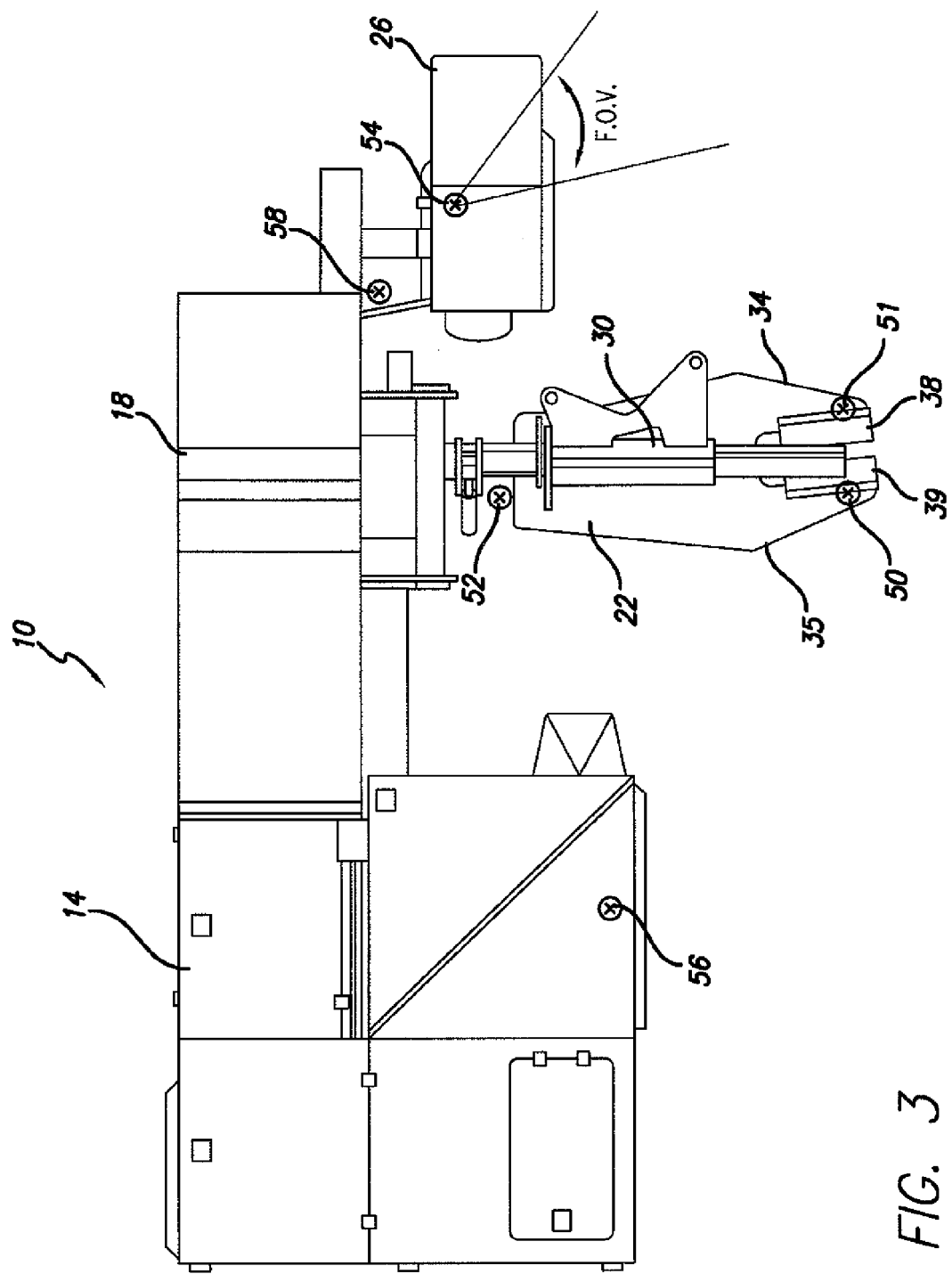
FIG. 3 is a top plan view of the harvester depicted in FIGS. 1 and 2.

FIGS. 1-3 depict a harvester machine that is improved by the inclusion of the automatic machine movement, tree sensing and shaking system of the present invention. FIG. 1 is a perspective of view of the harvester machine, FIG. 2 is a side elevational view thereof, and FIG. 3 is a top plan view thereof. As depicted in FIGS. 1-3, the harvester 10 includes a body 14 enclosing a drive engine, a forwardly disposed operator's cab 18, a tree clamping and shaking head 22 that is mounted to the body 14 such that the operator can view the tree clamping and shaking process, and a single front steering wheel 26, mounted on a caster, for maneuvering the harvester 10. The shaker head 22 is movably mounted upon an outwardly projecting support boom 30, such that the harvester can be positioned next to a tree and the shaker head 22 then moved outwardly to clamp and shake the tree. The shaker head 22 includes two jaws 34 and 35 having shaking pads 38 and 39 that are used to clamp and shake the tree.

In operation, the operator drives to the first tree and positions the shaker head 22 parallel to the tree row, aligning shaker head 22 with the first tree to be shaken. Sensor A, 50-51, detects the presence and location of the first tree. The operator then presses a button on the joystick in the cab to start the automatic cycle of steps. Support beam 30 moves out towards the tree. As the shaker 22 goes through its cycle, sensor D, 52 will measure the distance to the tree. The measurement takes place as shaker head 22 extends to the tree. Shaker head 22 stops when a beam between sensors 50 and 51 is broken by the tree. Jaws 34 and 35 clamp and shake the tree and then unclamp the tree and move back to the harvester 10. The length of time that the tree is shaken is predetermined and set in the controller (PLC).

When shaker 22 has completed shaking the tree and retracts, it will then take the information from sensor E, 54, having a field of view to measure the distance and angle to the next tree, and propel the machine forward. While propelling forward, sensor C, 56 determines when to stop by measuring the distance the machine has moved forward. This measurement is done by a pulse pick-up sensor C, 56 measuring the revolutions of tire 60. The machine is moved forward automatically by the PLC being operably engaged to the harvester engine to control the throttle of the engine, and stops when the measured distance has been traveled, as stated above.

Once again, the automatic cycle starts. Shaker 22 is extended to grasp and shake the second tree. Now sensor D, 52, takes a new distance measurement to the next tree, as it extends shaker 22. A calculation from the first tree to the second tree is made. The distance between the two is now used to figure the angular adjustment needed on the front steering caster. A signal actuates a valve to turn a steering caster on single forward wheel 26, until sensor B, 58, reaches the desired angle pointing shaker 22 in the right direction. Forward movement begins to the recalculated position and the cycle of steps then repeats itself.

With reference to the control system, the basic structure is described in U.S. Pat. No. 6,658,834 using a programmable logic control device (PLC). Applicant hereby incorporates by reference, the entire U.S. Pat. No. 6,658,834. What is added to that system are the additional sensors and controls, providing the additional information needed, as described above, to now propel the machine automatically from tree to tree, putting it in the proper position for the shaker to grasp and shake each tree, rather than the operator driving the machine from tree to tree.

Figure 4:
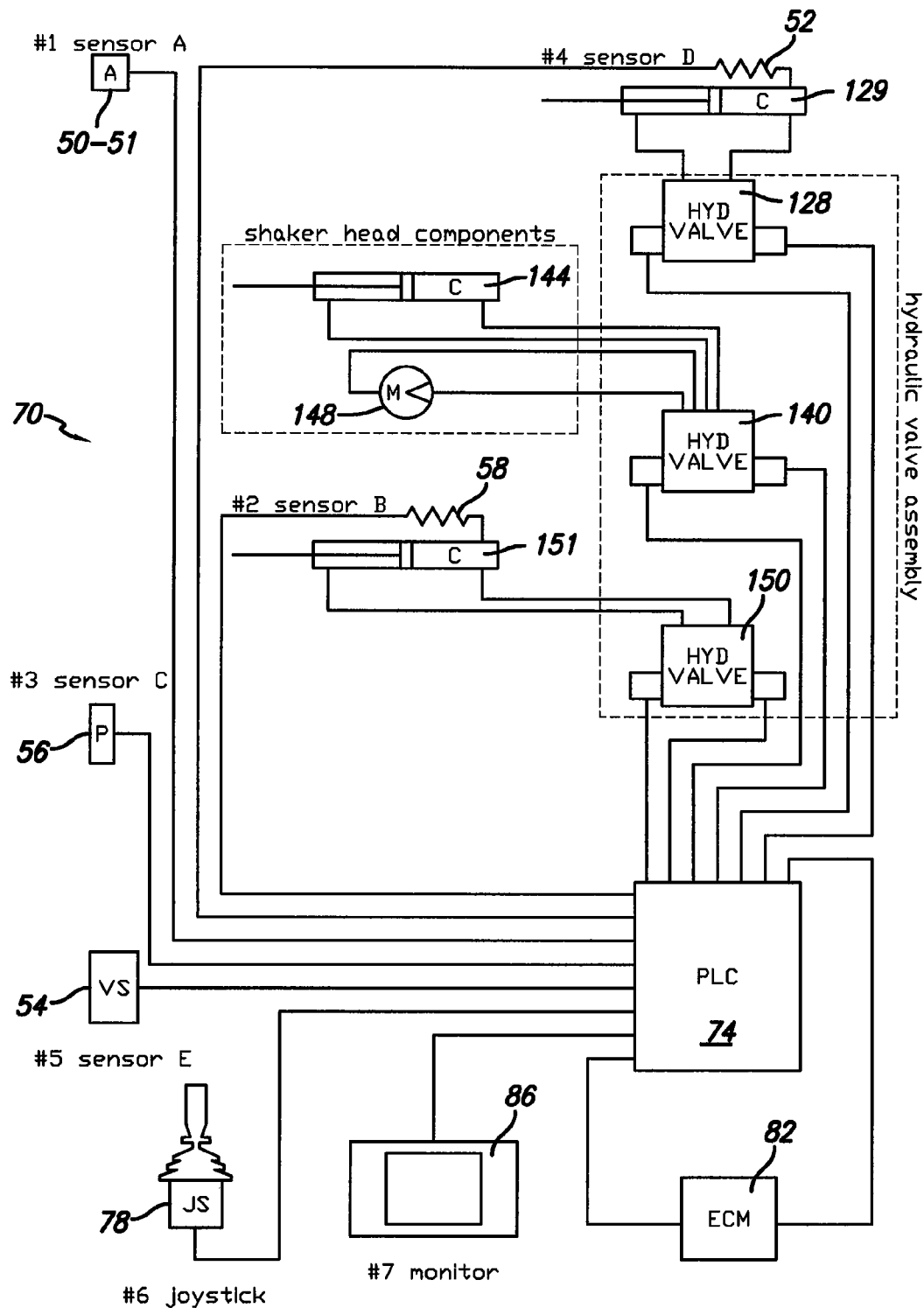
FIG. 4 is a schematic diagram of the tree sensing and shaking system of the present invention.

The control system schematic diagram of FIG. 4, utilizes a control system 70 similar to the control system set forth in Column 3, line 39 through Column 5, line 15, inclusive, of U.S. Pat. No. 6,658,834, which has been incorporated herein by reference, but with the additional sensors and controls set forth herein.

The system includes programmable logic control device (PLC) 74 with associated electronic and hydraulic systems to automatically control the tree sensing and shaking process.

PLC 74 receives input signals from tree sensor (A) 50-51, shaker head position sensor (D) 52, vision system sensor (E) 54, pulse pick-up sensor (C) 56 and front steering sensor (B) 58. PLC 74 also receives input signals from the joystick 78, engine control module 82, which includes an RPM sensor, and engine speed and shaker duration monitor 86. Shaker head 22 is operated by shaker head clamping hydraulic cylinders 128 and shaker head motors 148.

Predetermined programmable values, such as can be generated by potentiometer devices, as described in my prior patent, include a predetermined tree distance value potentiometer 94, one or more predetermined engine RPM value potentiometers 98, a predetermined clamping pressure value potentiometer 104 and a predetermined shaking time value potentiometer 112, all of which are input into PLC 74.

Output control signals from PLC 74 are provided to an engine RPM throttle servo 120, described in my prior patent, part of engine control module 82, one or more shaker head hydraulic fluid control valves 128 that supply hydraulic fluid to hydraulic cylinders 129 that control the inward and outward motion of the shaker head 22, and a shaker head manifold having hydraulic control valves 140 that supply hydraulic fluid to shaker head clamping hydraulic cylinders 144, and which provide electrical signals to one or more shaker head shaking motors 148 and hydraulic control valves 150 that supply hydraulic fluid to hydraulic cylinders 151 that control the direction of the front steering.

It is to be understood that the present invention is not to be limited to the detailed features of any particular control system, such as that depicted in FIG. 4, such as other types of control systems that may use other types of input devices than potentiometers to provide predetermined values to the system.

While the invention has been shown and described with reference to particular preferred embodiments, it will be understood by those skilled in the art that various alterations and modifications in form and detail may be made therein. Accordingly, it is intended that the following claims cover all such alterations and modifications as may fall within the spirit and scope of the invention.

What is claimed is:

1. A tree harvester, including a tree shaker head comprising:
   a body portion including an engine;
   a shaker head being movably engaged to the body, said shaker head comprising a pair of tree clamping pads;
   a programmable logic control device being operably engaged with said engine and said shaker head, said programmable logic control device comprising:
   means for sensing one tree located in a plurality of trees;
   means for determining the distance to said tree;
   means for causing said shaker head to move towards said tree, clamp, shake and unclamp said tree;
   means for causing said shaker head to move away from said tree;

means for determining the location of another of the plurality of trees; and, means for automatically driving said harvester to a new position to enable said shaker head to clamp, shake and unclamp each of said other plurality of trees.

2. The tree harvester of claim 1 in which the means for determining the location of another of the plurality of trees comprises a vision system to identify a tree trunk, calculate the distance to another tree and calculate the angular difference between trees.

3. The tree harvester of claim 1 in which the means for automatically driving the harvester to a new position comprises a linear potentiometer for controlling the steering of the harvester and a pulse pick-up to determine the distance moved.

4. The tree harvester of claim 1 in which said shaker head comprises an opposed pair of tree clamping pads.

5. The tree harvester of claim 4 in which each of said pair of tree clamping pads has a sensor which form a beam between said clamping pads, said shaker stopping its move forward when said beam is broken by said tree.

6. The tree harvester of claim 1 in which the harvester has a single forward wheel controlled by a steering caster.

7. The tree harvester of claim 1 in which the programmable logic control device comprises a timer to control the time duration of said shaking of said tree.

8. The tree harvester of claim 1 in which the means for determining the distance to a tree comprises a sensor mounted on said tree shaker.

9. The tree harvester of claim 1 in which the means for automatically driving the harvester to a new position comprises a steering caster for controlling the steering of the harvester and a pulse pick-up to determine the distance moved.

10. The tree harvester of claim 1 in which the means for determining the distance to said tree comprises a sensor mounted on said tree shaker.

11. A tree harvester comprising:
a body portion including an engine;
a tree shaker head, movably engaged to said body;
said shaker head comprising a pair of clamping pads;
a tree sensing device being mounted upon said tree harvester;
a sensor to determine the distance to a first tree located in a plurality of trees;
a sensor to determine the distance to a second tree located in the plurality of trees;
a linear potentiometer for determining the direction of the harvester;
a sensor to determine the distance that the harvester has traveled forward;
a programmable logic control device operably engaged with said sensors and potentiometer and operably engaged with said harvester to provide control signals to initiate a cycle that causes said shaker head to move towards said first tree, clamp, shake and unclamp said first tree, automatically drive said harvester to a second tree, clamp, shake and unclamp said second tree.

12. The tree harvester of claim 11 in which the sensor to determine the distance to a second of the plurality of trees comprises a vision system to identify a tree trunk, calculate the distance to the tree trunk and calculate the angular difference between the first and second tree.

13. The tree harvester of claim 11 in which each of said two clamping pads has a sensor, which cause said shaker head to stop its movement forward when said shaker head reaches said tree.

14. The tree harvester of claim 11 in which the harvester has a single forward wheel operated by a steering caster which is controlled by the programmable logic control device.

15. The tree harvester of claim 11 in which the programmable logic control device comprises a timer to control the time duration of said shaking of said tree.

16. A method for harvesting a plurality of trees, utilizing a tree shaking harvester having a control system, comprising the steps of;
positioning said harvester, including a tree shaker head having a tree sensor, proximate a tree;
determining the distance to said tree and inputting said distance to said tree into said control system;
providing first control signals from said control system to said shaker head to cause said shaker head to move towards said tree;
providing second control signals from said control system to stop said movement of said shaker head when said sensor in said shaker head detects said tree;
providing third control signals to said shaker head to cause said shaker head to clamp said tree, to shake said tree, to unclamp said tree, and to move said shaker head away from said tree;
providing fourth control signals from said control system to determine the location of the next tree;
providing fifth control signals from said control system to automatically move said harvester to said next tree;
repeating said first, second and third control signals from said control system to said shaker head to cause said shaker head to move towards said next tree, clamp said next tree, shake said next tree, unclamp said next tree, and move said shaker head away from said next tree; and,
repeating said first through fifth control signals from said control system for each of the plurality of trees.

17. The method for harvesting a plurality of trees of claim 16 in which the cycle is repeated for all of the plurality of trees.

18. The method as described in claim 16 including the further steps of inputting a predetermined tree shaking time into said control system to control the length of time said tree shaker shakes each of said trees.

* * * * *